United States Patent
Takemura et al.

(12)

(10) Patent No.: US 6,231,965 B1
(45) Date of Patent: May 15, 2001

(54) POLYCARBONATE/POLYOLEFIN RESIN COMPOSITION, PROCESS FOR PRODUCING THE SAME, AND MOLDINGS

(75) Inventors: Kazuya Takemura; Taichi Ogawa; Masato Takagi, all of Chiba (JP)

(73) Assignee: Kawasaki Chemical Holding Co., Inc., Wilmington, DE (US)

( * ) Notice: Subject to any disclaimer, the term of this patent is extended or adjusted under 35 U.S.C. 154(b) by 0 days.

(21) Appl. No.: 09/214,006

(22) PCT Filed: Apr. 24, 1998

(86) PCT No.: PCT/JP98/01902

§ 371 Date: Dec. 23, 1998

§ 102(e) Date: Dec. 23, 1998

(87) PCT Pub. No.: WO98/49233

PCT Pub. Date: Nov. 5, 1998

(30) Foreign Application Priority Data

Apr. 25, 1997 (JP) .................................................... 9-108767

(51) Int. Cl.$^7$ .............................. B32B 5/02; C08G 65/32; C08L 69/00
(52) U.S. Cl. ......................... 428/327; 428/412; 525/67; 525/133; 525/148; 525/409; 525/412
(58) Field of Search ............................... 525/67, 133, 148, 525/409, 412; 428/327, 412

(56) References Cited

U.S. PATENT DOCUMENTS 5,141,984 * 8/1992 Orikasa et al. ....................... 524/494
5,594,062 * 1/1997 Takemura et al. ................... 524/504

FOREIGN PATENT DOCUMENTS

| 0 763 565 A2 | 3/1997 | (EP) . |
| 5-171011 | 7/1993 | (JP) . |
| 8-157664 | 6/1996 | (JP) . |
| 8-157732 | 6/1996 | (JP) . |

OTHER PUBLICATIONS

Encyclopedia of Polymer Science and Engineering, vol. 1: Additives, pp. 472–475, Aug. 1985.*

* cited by examiner

*Primary Examiner*—Paul Thibodeau
*Assistant Examiner*—Ramsey Zacharia
(74) *Attorney, Agent, or Firm*—Akin, Gump, Strauss, Hauer & Feld, L.L.P.

(57) ABSTRACT

A polycarbonate/polyolefin resin composition which has excellent wear property, mechanical strength and flame retardancy and which is adapted for use as a material for OA equipment, home appliance, automobile components, medical apparatus, and the like is provided. The polycarbonate/polyolefin resin composition contains a polycarbonate resin (A), a polyolefin resin (B), a modified polyolefin resin (C), a compound (D) represented by the formula (d): HOOC—R—NH$_2$, a styrene copolymer resin (E), and a brominated polycarbonate oligomer and said diantimony tetraoxide and/or said diantimony pentaoxide (F) in a particular combination. The production process and an article molded from such resin composition are also provided.

13 Claims, No Drawings

POLYCARBONATE/POLYOLEFIN RESIN COMPOSITION, PROCESS FOR PRODUCING THE SAME, AND MOLDINGS

TECHNICAL FIELD

This invention relates to a polycarbonate/polyolefin resin composition, its production process, and articles molded therefrom, and more particularly, to a polycarbonate/polyolefin resin composition which has excellent wear property, mechanical strength and flame retardancy and which is adapted for use as a material for OA equipment, home appliance, automobile components, medical apparatus, and the like; its production process; and an article molded from such polycarbonate/polyolefin resin composition.

BACKGROUND ART

Polycarbonates (hereinafter referred to as "PC") are widely used in the fields of automobile, electricity and the like in view of their excellent heat resistance, impact resistance, and electric properties and sufficient dimensional stability. PC, however, suffer from high melt viscosity as well as inferior organic solvent resistance and abrasion/wear resistance, and use of PC has been limited in the fields where such properties are required. In order to obviate such drawbacks of the PC, compositions having a polyolefin resin blended in the PC have been proposed (JP-B 40-13664, JP-A 59-223741). These compositions, however, have been impractical since the low compatibility between the PC and the polyolefin resulted in delamination and poor appearance of the resulting products produced by such means as injection molding. In order to obviate such poor compatibility between the PC and the polyolefin, PC-polyolefin compositions having a polystyrene-polyolefin copolymer such as SEBS (styrene-ethylene/butylene-styrene copolymer) or SEP (styrene-ethylene/propylene copolymer) blended thereto have been proposed (JP-A 64-75543 etc.). The polystyrene-polyolefin copolymer used, however, had various properties inherent to an elastomer, and the resulting composition suffered from poor heat resistance and flexural rigidity.

JP-A 63-215750 discloses a composition comprising a PC, a polyolefin, a PC having carboxyl group in the terminal of the molecule, and a polypropylene having epoxy group. JP 63-215752 discloses a composition comprising a PC, a polyolefin, a PC having hydroxyl group in the terminal of the molecule, and a polypropylene having carboxyl group. These compositions do not undergo delamination and exhibit excellent mechanical strength and high resistance to organic solvents as well as sufficient appearance (with no delamination). The PC having carboxyl group or hydroxyl group used as a component in these compositions is produced by adding a special monomer in its polymerization process. When a manufacturer who does not have a PC polymerization plant attempts to practice such production process, a new PC polymerization plant and a large expenditure is required, and therefore, production of such composition had been quite difficult for such manufacturer. In addition, various properties remained unsatisfactory compared to those of the PC itself. Improvement in the various properties is still required.

Addition of a fluororesin such as polytetrafluoroethylene to the polycarbonate resin for the purpose of improving abrasion/wear properties is already carried out. The compositions comprising the polycarbonate and the fluororesin added thereto have good wear properties in addition to the various favorable properties of the polycarbonate resin, and such compositions have been mainly used for the components (such as gears and cams) in the fields of OA equipment, home appliance and the like which require heat resistance, impact resistance, and sliding properties. The fluororesins, however, are quite expensive and toxic gases are produced in their incineration after disposal. Accordingly, development of a new polycarbonate-based slidable material which can be used instead of such polycarbonate resin/fluororesin composition is highly awaited.

Polyolefins, and in particular, high density polyethylene, low density polyethylene, and linear low density polyethylene are inferior to the polycarbonate resin in heat resistance, flexural rigidity and flame retardancy although they are inexpensive and excellent in abrasion/wear resistance. Accordingly, it has been difficult to use a polyolefin in the fields wherein the polycarbonate/fluororesin compositions have been used. In view of such situation, attempts have been made to develop a composition having the excellent heat resistance, impact resistance, flame retardancy and the like of the polycarbonate resin and the excellent abrasion/wear resistance of the polyethylene by blending the polycarbonate and the polyethylene. Compatibility of the polycarbonate and the polyethylene, however, is extremely low, and the resins produced by merely kneading these resins suffered from delamination and surface peeling upon exposure to abrasion and wear, and hence, poor wear properties.

In view of such situation, the inventors of the present invention have found that a composition comprising a polycarbonate resin, a modified polyolefin, and an aminocarboxylic acid has excellent compatibility, wear property, mechanical properties and no delamination, and the problems as described above can be obviated by such composition, and proposed in JP-A 8-157664. This composition, however, had the problem that the flame retardancy was still insufficient for some applications. Also known is addition of a brominated polycarbonate oligomer and diantimony trioxide for the purpose of improving the flame retardancy of an aromatic polyester resin containing a polycarbonate resin (JP-A 62-172054). Such addition of diantimony trioxide to the polycarbonate resin had the problem of reduced thermal stability. JP-A 51-88551 and JP-A 61-235454 disclose frame retardant resin compositions comprising a polycarbonate resin having added diantimony tetraoxide or diantimony pentaoxide thereto. Such resins, however, were insufficient in wear property.

SUMMARY OF THE INVENTION

The first objective of the present invention is to provide a PC/polyolefin resin composition which is provided with the excellent mechanical properties of the PC and the good moldability and other favorable properties of the polyolefin, which exhibits excellent surface properties without undergoing delamination, and which has high flame retardancy.

The second object of the present invention is to provide a process which is capable of producing the PC/polyolefin resin composition as described above in a convenient manner by using a kneader.

The third object of the present invention is to provide an article prepared by melting and molding the PC/polyolefin resin composition having excellent properties as described above.

In order to obviate the problems as described above, the present invention provides resin compositions containing the following components (A) to (F) in particular combinations.

(A) a polycarbonate resin, (B) a polyolefin resin, (C) a modified polyolefin resin, (D) a compound represented by the following formula (d):

HOOC—R—NH$_2$ (d)

wherein R is an alkylene group, an alkylidene group, an oligomethylene group, a phenylene group, or a naphthylene group containing at least 5 carbon atoms, the phenylene group and the naphthylene group being optionally substituted with a substituent, (E) a styrene copolymer resin, and (F) a brominated polycarbonate oligomer and diantimony tetraoxide and/or diantimony pentaoxide.

As the first embodiment of the resin compositions of the present invention, there is provided a polycarbonate/polyolefin resin composition produced by melt kneading (A) a polycarbonate resin, (C) a modified polyolefin resin modified with at least one functional group selected from the group consisting of epoxy group, carboxyl group, and acid anhydride group, (D) a compound represented by the following formula (d):

HOOC—R—NH$_2$ (d)

wherein R is an alkylene group, an alkylidene group, an oligomethylene group, a phenylene group, or a naphthylene group containing at least 5 carbon atoms, the phenylene group and the naphthylene group being optionally substituted with a substituent, and (F) a brominated polycarbonate oligomer and diantimony tetraoxide and/or diantimony pentaoxide. (Such resin composition is hereinafter referred to as "the first composition of the invention".)

The composition of the present invention is preferably a resin composition produced by melt kneading said polycarbonate resin (A), said modified polyolefin resin (C), said compound (D) represented by the formula (d), said brominated polycarbonate oligomer and said diantimony tetraoxide and/or said diantimony pentaoxide (F), and (B) a polyolefin resin. (Such resin composition is hereinafter referred to as "the second composition of the invention".)

The composition of the present invention is also preferably a polycarbonate/polyolefin resin composition produced by melt kneading said polycarbonate resin (A), said modified polyolefin resin (C), said compound (D) represented by the formula (d), said brominated polycarbonate oligomer and said diantimony tetraoxide and/or said diantimony pentaoxide (F), and (B) a polyolefin resin, and (E) a styrene copolymer resin. (Such resin composition is hereinafter referred to as "the third composition of the invention".)

The present invention also provides, as the production process of the first composition of the invention, a process for producing a polycarbonate/polyolefin resin composition comprising the steps of melt kneading (C) a modified polyolefin resin modified with at least one functional group selected from the group consisting of epoxy group, carboxyl group, and acid anhydride group and (D) a compound represented by the following formula (d):

HOOC—R—NH$_2$ (d)

wherein R is an alkylene group, an alkylidene group, an oligomethylene group, a phenylene group, or a naphthylene group containing at least 5 carbon atoms, the phenylene group and the naphthylene group being optionally substituted with a substituent; and adding (A) a polycarbonate resin and (F) a brominated polycarbonate oligomer and diantimony tetraoxide and/or diantimony pentaoxide to the melt kneaded (C) and (D) and further melt kneading the mixture.

The present invention also provides, as the production process of the second composition of the invention, a process for producing a polycarbonate/polyolefin resin composition comprising the steps of melt kneading (C) a modified polyolefin resin modified with at least one functional group selected from the group consisting of epoxy group, carboxyl group, and acid anhydride group and (D) a compound represented by the following formula (d):

HOOC—R—NH$_2$ (d)

wherein R is an alkylene group, an alkylidene group, an oligomethylene group, a phenylene group, or a naphthylene group containing at least 5 carbon atoms, the phenylene group and the naphthylene group being optionally substituted with a substituent; and adding (A) a polycarbonate resin, (B) a polyolefin resin, and (F) a brominated polycarbonate oligomer and diantimony tetraoxide and/or diantimony pentaoxide to the melt kneaded (C) and (D) and further melt kneading the mixture.

The present invention also provides, as the production process of the third composition of the invention, a process for producing a polycarbonate/polyolefin resin composition comprising the steps of melt kneading (C) a modified polyolefin resin modified with at least one functional group selected from the group consisting of epoxy group, carboxyl group, and acid anhydride group and (D) a compound represented by the following formula (d):

HOOC—R—NH$_2$ (d)

wherein R is an alkylene group, an alkylidene group, an oligomethylene group, a phenylene group, or a naphthylene group containing at least 5 carbon atoms, the phenylene group and the naphthylene group being optionally substituted with a substituent; and adding (A) a polycarbonate resin, (B) a polyolefin resin, (F) a brominated polycarbonate oligomer and diantimony tetraoxide and/or diantimony pentaoxide, and (E) a styrene copolymer resin to the melt kneaded (C) and (D) and further melt kneading the mixture.

The present invention also provides a molded article produced by melting and molding the polycarbonate/polyolefin resin composition as described above.

PREFERRED EMBODIMENT OF THE INVENTION

Next, the polycarbonate/polyolefin resin composition, its production process, and the article molded therefrom of the present invention are described in detail.

The first composition of the present invention comprises the components (A), (C), (D) and (F).

The PC resin used for the component (A) in the first composition of the present invention is a thermoplastic aromatic polycarbonate polymer obtained by reacting an aromatic dihydroxy compound or an aromatic dihydroxy compound and a small amount of polyhydroxy compound with phosgene or a carbonic acid or its diester. Exemplary aromatic dihydroxy compounds include 2,2-bis(4-hydroxyphenyl)propane (=bisphenol A), tetramethyl-bisphenol A, tetrabromobisphenol A, bis(4-hydroxyphenyl)-p-diisopropylbenzene, hydroquinone, resorcinol, 4,4'-dihydroxydiphenyl, bis(4-hydroxyphenyl)sulfide, bis(4-hydroxyphenyl)ketone, 1,1-bis(4-hydroxyphenyl)ethane, and 1,1-bis(4-hydroxyphenyl)cyclohexane, which may be used alone or as a mixture of two or more. Among these, the preferred is bisphenol A in view of the excellent heat resistance, mechanical properties, and moldability of the resulting composition. When a mixture of two or more aromatic dihydroxy compounds is used, use of the combinations of bisphenol A with tetramethyl bisphenol A, and bisphenol A with tetrabromobisphenol A are preferred.

The PC resin used may preferably have a melt flow rate (MFR) (ASTM D1238, 230° C., load: 2.16 kg) of 1 to 30 g/10 min, and more preferably 4 to 20 g/10 min. Use of the PC resin with a MFR of less than 1 g/10 min results in the poor molding workability of the resulting composition, while use of the PC resin with a MFR in excess of 30 g/10 min results in the poor impact strength of the resulting composition.

The PC resin may preferably have a non-limited number average molecular weight (calculated in terms of polystyrene) of 1,000 to 100,000, and more preferably 5,000 to 40,000. When the molecular weight is below such range, the resulting composition will suffer from poor properties including insufficient impact strength, and when the molecular weight is in excess of such range, the resulting composition will suffer from poor molding workability.

The PC resin used may be the one admixed with a crystalline or a non-crystalline thermoplastic resin to a content not adversely affecting the merit of the present invention. Mixing of a crystalline thermoplastic resin has the merit of improving chemical resistance and the like, and mixing of a non-crystalline thermoplastic resin has the merit of improving heat resistance and the like. Exemplary crystalline and non-crystalline thermoplastic resins include polyethylene terephthalate, polybutylene terephthalate, bisphenol-type polyallylate, 6,6-nylon, 6-nylon, and 6-10-nylon. When a crystalline or a non-crystalline thermoplastic resin is admixed with the PC resin, the amount mixed is preferably up to 20% by weight, and more preferably up to 10% by weight.

The content of the PC resin in the first composition of the present invention is preferably 40 to 99% by weight, more preferably 60 to 95% by weight, and most preferably 80 to 95% by weight. When the content of the PC resin is less than 40% by weight, the resulting composition exhibits poor heat resistance and impact resistance, while the content of the PC resin in excess of 90% by weight results in inferior molding workability of the resulting composition. However, when the PC resin is used for the purpose of improving the heat resistance, rigidity, and flame retardancy of the polyolefin resin, the content of the PC resin may be 40% by weight or less.

The modified polyolefin resin (C) used in the first composition of the present invention is a modified polyolefin resin modified with at least one functional group selected from the group consisting of epoxy group, carboxyl group, and acid anhydride group. The modified polyolefin resin used may be the polyolefin resin which is the same as the one used as the component (B) copolymerized with an unsaturated monomer containing at least one functional group selected from epoxy group, carboxyl group, and acid anhydride group.

Exemplary unsaturated monomers containing epoxy group include glycidyl methacrylate, butylglycidyl malate, butylglycidyl fumarate, propylglycidyl malate, glycidyl acrylate, and N-[4-(2,3-epoxypropoxy)-3,5-dimethylbenzyl] acrylamide. Among these, the preferred are glycidyl methacrylate and N-[4- (2,3-epoxypropoxy) -3,5-dimethylbenzyl] acrylamide in view of the price and availability.

Exemplary unsaturated monomers containing carboxyl group include acrylic acid, methacrylic acid, and maleic acid. Exemplary unsaturated monomers containing acid anhydride group include maleic anhydride, itaconic anhydride, and citraconic anhydride. Among these, the preferred are acrylic acid and maleic anhydride in view of the reactivity and availability.

The modified polyolefin resin most preferably used in the present invention is polyethylene modified with maleic anhydride in view of its ability to improve the slidability of the resulting composition. The polyethylene modified with maleic anhydride comprises a main skeleton comprising a polyethylene and the maleic anhydride as the unsaturated monomer. The polyethylene constituting the main skeleton of the modified polyethylene is preferably, a straight-chain low density polyethylene, a low density polyethylene, or a high density polyethylene, and most preferably, a linear low density polyethylene or a low density polyethylene. The modified polyethylene may generally have a molecular weight such that the melt flow rate (MFR) is in the range of 0.1 to 20 g/10 min, and more preferably, in the range of 0.2 to 10 g/10 min. Use of a modified polyethylene having the melt flow rate below such range may result in poor molding workability, and use of a modified polyethylene having the melt flow rate in excess of such range may result in poor slidability.

Production of the modified polyolefin resin by copolymerizing an unsaturated monomer containing at least one functional group selected from epoxy group, carboxyl group, and acid anhydride group with the polyolefin resin may be conducted by any non-limited process. The modified polyolefin resin may be produced, for example, by melt kneading the polyolefin resin and the unsaturated monomer in the presence or absence of a radical initiator by using a twin screw extruder, a Banbury mixer, a kneader, or the like; or by copolymerizing the monomer constituting the polyolefin resin with an unsaturated monomer. The content of the unsaturated monomer in the modified polyolefin resin is in the range of 0.01 to 10% by weight, and most preferably 0.1 to 5% by weight. The content of the unsaturated monomer below such range results in the reduced improvement in the delamination of the resulting composition, and the content of the unsaturated monomer beyond such range may adversely affect long term heat resistance and other properties of the resulting composition.

The content of the modified polyolefin resin in the first composition of the present invention is preferably in the range of 0.5 to 60% by weight, more preferably 0.5 to 30% by weight, and most preferably 0.5 to 20% by weight. When the modified polyolefin content is below such range, the resulting composition will exhibit reduced compatibility with the PC to invite delamination, and the content beyond such range results in the poor heat resistance and the like of the resulting composition. However, when the modified polyolefin resin is used for the purpose of improving the heat resistance and rigidity of the polyolefin resin, the modified polyolefin resin may be used at a content in excess of 60% by weight.

The compound (D) used in the first composition of the present invention is a compound represented by the following formula (d):

HOOC—R—NH$_2$  (d)

In formula (d), R is an alkylene group, an alkylidene group, an oligomethylene group, a phenylene group, or a naphthylene group containing at least 5 carbon atoms. No upper limit is set for the number of carbon atoms in R although R may preferably contain up to 20 carbon atoms, and more preferably, up to 12 carbon atoms. The compound wherein R contains an excessively large number of carbon atoms is difficult to obtain in industrial scale, and the use of such compound results in poor heat resistance. The compound wherein R contains less than 5 carbon atoms is likely to evaporate or sublimate during the production of the composition. Exemplary alkylene groups include pentylene group (—C$_5$H$_{10}$—), hexylene group (—C$_6$H$_{12}$—). The alkylidene group may be any of straight-chain, branched, and alicyclic group. Exemplary oligomethylene groups are those wherein 5 to 20 ethylene groups are linked in straight chain manner. Exemplary phenylene groups include p-phenylene group, m-phenylene group, and o-phenylene group, and exemplary naphthylene groups include 2,6-naphthylene group, 2,7-naphthylene group, 1,5-naphthylene group, 1,8-naphthylene group, and 4,4'-diphenylene group. The phenylene group and the naphthylene group may be optionally substituted with a substituent such as an alkyl group, carboxyl group, a halogen atom, amino group, or an alkoxy group.

Examples of the compound represented by the formula (d) include 6-aminocaproic acid, 7-aminoheptanoic acid, 8-aminooctanoic acid, 11-aminoundecanoic acid, p-aminobenzoic acid, m-aminobenzoic acid, 2-amino-6-naphthalene carboxylic acid, and 2-amino-7-naphthalene carboxylic acid.

Content of the compound (D) represented by the formula (d) in the first composition of the present invention may be 0.05 to 5% by weight, preferably 0.05 to 4% by weight, and more preferably 0.05 to 2% by weight. When the content is below such range, the composition will suffer from poor compatibility between the components, and hence, result in marked delamination. When the content is in excess of such range, the PC resin, which is the component (A), will undergo a marked decrease in its molecular weight and the resulting composition will suffer from reduced impact strength.

The first composition of the present invention contains a brominated polycarbonate oligomer and diantimony tetraoxide and/or diantimony pentaoxide as its component (F). Inclusion of the component (F) enables production of the composition having improved flame retardancy without detracting from the sliding properties, the solvent resistance and the mechanical strength.

The brominated polycarbonate oligomer is a polycarbonate which contains bromine atom in its molecular skeleton, and whose number of recurring units is in the range of 2 to 100, and preferably 3 to 10. The brominated polycarbonate oligomer may have bromine atom bonded to its molecular skeleton at non-limited position, while bonding of the bromine atom to the aromatic ring is preferred. In addition, the brominated polycarbonate oligomer used is preferably the one whose molecule is terminated with an alkyl phenol or the like in view of heat stability.

In the present invention, either one or both of the diantimony tetraoxide and the diantimony pentaoxide may be used in combination with the brominated polycarbonate oligomer as the component (F). Diantimony trioxide which is a widely used common flame retardant additive can not be used in the present invention since decomposition of the resin components is promoted by this compound and this compound is incapable of imparting sufficient flame retardancy.

The ratio at which the brominated polycarbonate oligomer and the diantimony tetraoxide and/or the diantimony pentaoxide of the component (F) are used is not particularly limited. However, use at a brominated polycarbonate oligomer/(diantimony tetraoxide and/or diantimony pentaoxide) ratio in the range of 10/1 to 1/2 is preferable, and at ratio in the range of 3/1 to 1/1 is more preferable, and at 2/1 is most preferable in view of its ability to improve the flame retardancy.

The total content of the brominated polycarbonate oligomer and the diantimony tetraoxide and/or the diantimony pentaoxide of the component (F) in the first composition of the present invention is not particularly limited. The component (F), however, is preferably used at a content of 0.3 to 15% by weight, and more preferably, at a content of 1.0 to 5% by weight in order to balance the flame retardancy and the wear properties.

The second composition of the present invention comprises a polyolef in resin (B) in addition to the components (A), (C), (D) and (F) of the first composition of the present invention. The components (A), (C), (D) and (F) are the same as those described above for the first composition.

Exemplary polyolefin resins which may be used as the component (B) in the second composition of the present invention include a crystalline polypropylene, a crystalline propylene-ethylene block copolymer and random copolymer, a low density polyethylene, a high density polyethylene, a linear low density polyethylene, a ultra-high molecular weight polyethylene, an ethylene-propylene random copolymer, and an ethylene-propylene-diene copolymer which may be used alone or in combination of two or more. Among these, the preferred are the crystalline polypropylene, the crystalline propylene-ethylene copolymer, the low density polyethylene, the high density polyethylene, the linear low density polyethylene, and the ultra-high molecular weight polyethylene.

The polyolefin resin may have a non-limited melt flow rate (MFR) (at 230° C.; load: 2.16 kg) which is preferably in the range of 0.1 to 70 g/10 min, and more preferably in the range of 0.5 to 30 g/10 min. Use of a polyolefin resin with the MFR below such range results in inferior molding workability of the resulting composition while use of a polyolefin resin with the MFR beyond such range results in poor impact strength.

The polyolefin resin may preferably be used in the second composition of the present invention at a content of 0.1 to 60% by weight, more preferably at a content of 0.2 to 55% by weight, still more preferably at a content of 3 to 50% by weight, and most preferably at a content of 3 to 20% by weight. Content of the polyolefin resin beyond such range results in poor heat resistance of the resulting composition. However, when the polyolefin resin is added for the purpose of improving the heat resistance and flame retardancy of the polyolefin resin, the content may be below 60% by weight.

The third composition of the present invention comprises a styrene copolymer resin (E) in addition to the components (A), (B), (C), (D) and (F) of the first composition of the present invention. The components (A), (B), (C), (D) and (F) are the same as those described above for the first and the second compositions.

The styrene copolymer resin used for the component (E) in the third composition of the present invention is a copolymer of styrene with an olefin or butadiene. The styrene copolymer resin may be a copolymer in the form of a block copolymer, a graft copolymer or an alternating copolymer. Exemplary block copolymers include a styrene-ethylene/propylene copolymer, a styrene-butadiene-styrene copolymer, and a styrene-ethylene/butylene-styrene copolymer. Exemplary graft copolymers include a polystyrene grafted polypropylene, a polystyrene polyacrylonitrile grafted polypropylene, a polystyrene grafted low density polypropylene, and a polystyrene polyacrylonitrile grafted low density polypropylene. Exemplary alternating copolymers include a styrene-butadiene copolymer.

The styrene copolymer resin may be used in the third composition of the present invention at a content of 0.05 to 30% by weight, and preferably at a content of 0.5 to 10% by weight. The styrene copolymer resin used at a content below such range has no substantial effects, and addition at a content beyond such range adversely affects the heat resistance and flexural rigidity of the resulting composition.

In addition to the components (A) to (F) as described above, the first, the second and the third composition of the present invention may have added thereto another thermoplastic resin, a resin components other than the thermoplastic resin, an elastomer, a pigment, an organic/inorganic filler and the like. Exemplary thermoplastic resins include polyethylene terephthalate, polybutylene terephthalate, nylon, modified PPO, liquid crystalline resins, Teflon, and the like, and typical resin components other than the thermoplastic resin is silicone oil. Exemplary inorganic fillers include aramid fiber, carbon fiber, talk, mica, calcium carbonate, potassium titanate whisker, and the like. Additives generally used in combination with a thermoplastic resin such as a plasticizer and an antioxidant may also be used in an adequate amount.

The first composition of the present invention may be prepared by the process comprising the steps of melt kneading the modified polyolefin resin (C) and the compound (D) represented by the formula (d); and adding the polycarbonate resin (A) and the brominated polycarbonate oligomer and the diantimony tetraoxide and/or the diantimony pentaoxide (F) to the melt kneaded (C) and (D) and further melt kneading the mixture.

The second composition of the present invention may be prepared by the process comprising the steps of melt kneading the modified polyolefin resin (C) and the compound (D) represented by the formula (d); and adding the polycarbonate resin (A), the polyolefin resin (B) and the brominated polycarbonate oligomer and the diantimony tetraoxide and/or the diantimony pentaoxide (F) to the melt kneaded (C) and (D) and further melt kneading the mixture.

The third composition of the present invention may be prepared by the process comprising the steps of melt kneading the modified polyolefin resin (C) and the compound (D) represented by the formula (d); and adding the polycarbonate resin (A), the polyolefin resin (B), the brominated polycarbonate oligomer and the diantimony tetraoxide and/or the diantimony pentaoxide (F), and the styrene copolymer resin (E) to the melt kneaded (C) and (D) and further melt kneading the mixture.

In the more preferable production process of the first, the second, and the third composition of the present invention, the composition is prepared by melt kneading the components (C) and (D); and adding the component (A) to the melt kneaded (C) and (D) followed by the addition of other components (components (B), (E) and (F)).

In such processes, the components (C) and (D) are melt kneaded to promote the reaction between the components (C) and (D) to form a compatibilizer precursor, and the thus formed compatibilizer precursor is reacted with the component (A) to form a compatibilizer. A resin composition having improved compatibility between the components is thereby produced. When a modified polyolefin resin modified with at least one functional group selected from the group consisting of carboxyl group and acid anhydride group is used for the component (C), the modified polyolefin resin modified with at least one functional group selected from the group consisting of carboxyl group and acid anhydride group undergoes a reaction with the compound (D) represented by the formula (d) to form a compatibilizer precursor having a bond represented by the following formula (H):

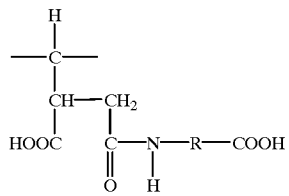

The functional group moiety (—COOH) of the compatibilizer precursor is allowed to react with the polycarbonate resin for the production of the compatibilizer. When a modified polyolefin resin modified with epoxy group is used for the component (C), the modified polyolefin resin modified with epoxy group undergoes a reaction with the compound (D) represented by the formula (d) to form a compatibilizer precursor having a bond represented by the following formula (J):

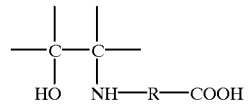

The functional group moiety (—COOH) of the compatibilizer precursor is allowed to react with the polycarbonate resin for the production of the compatibilizer.

In the production of the composition of the present invention, when the components (A), (C), and (D) are mixed and melt kneaded at once, the compatibilizer as described above is not smoothly formed, and the side reaction that took place results in the reduced strength of the resulting composition. Therefore, such simultaneous melt kneading is not preferred.

In the production of the compositions of the present invention, a compatibilizer is formed during the melt kneading steps, and the compatibility between the PC resin (A) and the polyolefin resin (B) or (C) is thereby improved to enable the accomplishment of the polymer alloy formation, presumably, through formation of a graft polymer between the PC resin and the polyolefin resin.

The estimated reason why the compatibilizer formed during the production steps of the compositions of the present invention is effective for compatibilizing the PC resin and the polyolefin resin components is as described below. The —NH$_2$ group contained in the component (D) forms amide bond through the reaction with the carboxyl group or the acid anhydride group in the component (C); or amino bond through the reaction with the epoxy group in the component (C), and the component (D) thereby adds to the component (C). Through such process, the carboxyl group of the component (D) is introduced into the component (C) via the particular chemical bond such as amide bond or amino bond. The carboxyl group introduced into the component (C) then reacts with the carbonate bond of the component (A), and there takes a decomposition into a polycarbonate-grafted polyolefin wherein the polycarbonate and the component (C) are bonded through ester bond, a polycarbonate having terminal —OH group, and $CO_2$. The thus formed polycarbonate-grafted polyolefin has the polycarbonate moiety and the polyolefin moiety in one molecule, and therefore, such polycarbonate-grafted polyolefin should serve an effective compatibilizer.

In order to produce an effective compatibilizer, it is preferable to react the components such that the amount of the functional groups in the component (C), amount of the component (D), and the amount of the component (A) are stoichiometric, and in addition, use of the component (A) with a higher degree of polymerization and the component (C) with a higher degree of the polymerization of the polyolefin are preferred.

In the production of the compositions of the present invention, a single screw extruder, a twin screw extruder, a kneader, a Brabender mixer and the like may be used for the melt kneading of the components to promote the polymer alloy formation at a high efficiency. Among these, use of a twin screw extruder is preferable for efficient alloying. The reaction (melt kneading) temperature is preferably in the range of 265° C. to less than 380° C., and more preferably, in the range of 270° C. to 340° C. When the reaction temperature is less than 265° C., sufficient compatibilization between the PC resin and the polyolefin is not accomplished, and the resulting resin composition is likely to undergo delamination in its molding process. When the reaction temperature is in excess of 380° C., the resulting resin composition will experience thermal degradation to exhibit inferior mechanical properties. In some cases, some of the components, for example, a part of the PC resin (A) and the compound (D) represented by the formula (d) may be preliminarily kneaded before kneading the residual components. In such process, a compatibilizer precursor is formed in the melt kneading step, and the compatibilizer formed from the compatibilizer precursor facilitates microphase dispersion of the polyolefin particles in the matrix of the blend of the polycarbonate resin (A) and/or the styrene copolymer resin (E). In order to produce a molded article having an improved slidability, the dispersed polyolefin particles may preferably have an average particle size of 0.1 $\mu$m to 5 $\mu$m and an average aspect ratio of up to 5.

The molded article of the present invention is an article fabricated by melt molding the first, the second, or the third composition as described above by a process commonly used for the molding of a thermoplastic resin. Exemplary such molding process include injection molding, blowmolding, sheet molding, lamination molding, and press molding. Among these, the preferred is the injection molding conducted at a melt temperature in the range of 240 of 360° C. and a mold temperature of 40 to 130° C.

In the molded article of the present invention, average aspect ratio (major axis/minor axis) of the dispersed particles of the polyolefin resin in the area from the surface of the molded article to the depth of 20 $\mu$m is preferably up to 5. When the average aspect ratio is in excess of 5, the molded article will suffer from reduced slidability, probably because of laminate structure near the article surface and the resulting increase in peeling and in the amount of wear. The polyolefin resin particles are preferably is polyethylene particles. Such dispersion of the polyolefin resin particles is attained, for example, when the polycarbonate resin is blended at an amount of 90% or more, the modified polyethylene is blended at an amount of up to 10%, and the compound having the structural unit (D) is blended in an amount of 0.05 to 2.0% by weight. The particle dispersion, however, is influenced by such factor as molding temperature, injection rate, cooling rate, and the like, and the above-specified condition is merely given as an example.

The molded article of the present invention may have an inorganic filler such as glass fiber, carbon fiber, aramid fiber, talk, mica, calcium carbonate, or the like of a content which does not adversely affect the merits of the present invention. Addition of the glass fiber, carbon fiber or the aramid fiber is particularly preferable in view of increase in the flexural rigidity and sliding properties. Addition of silicone oil, molybdenum compound, or the like is also preferable since addition of such additives is likely to result in improved sliding properties. The molded article may also have a plasticizer, an antioxidant, and other additives commonly added to a thermoplastic resin at an adequate amount.

The molded article of the present invention is particularly excellent in slidability, and therefore, the article is adapted for use as a part in OA equipment, home appliance and medical apparatus, and in particular, for use as a part such as gear, cam, bearing or the like.

EXAMPLES

The present invention is described in further detail by referring to the following Examples which by no means limit the scope of invention. The starting materials, abbreviations for the starting materials, equipment, and the evaluations are as described below.

Starting Materials (A) Polycarbonate resin PC: manufactured by Sumitomo Dow, Calibre 200-4 (MFR: 4 g/10 min)

(B) Polyolefin resin PP: polypropylene, manufactured by Sumitomo Chemicals, Nobrene W101 (MFR: 8 g/10 min, homopolymer) PE: polyethylene, Nippon Oil Chemical, Linilex AM0710 (MFR: 0.4 g/10 min, straight chain low density polyethylene)

(C) Modified polyolefin resin
  MAPP: polypropylene modified with maleic anhydride, manufactured by Mitsubishi Chemical Industries, AP590P
  EpPP: polypropylene modified with epoxy, manufactured by Tonen Chemical Industries, C-900X modified
  MAPE: polyethylene modified with maleic anhydride, manufactured by Mitsui Petrochemical Industries, Admer NF 300

(D) Compound represented by the formula (d)
  AU: 11-aminoundecanoic acid (manufactured by Aldrich)
  AC: 6-aminocaproic acid (manufactured by Aldrich)
  AA: p-aminobenzoic acid (manufactured by Aldrich)

(E) Styrene copolymer resin
  SEP: styrene-ethylene-propylene copolymer, manufactured by Shell Chemical, Clayton 1701X
  SBS: styrene-butadiene-styrene copolymer, manufactured by Asahi Chemical Industry, Toughtech (F) Brominated Polycarbonate Oligomer, diantimony tetraoxide, diantimony pentaoxide:
  BPC: brominated polycarbonate oligomer, manufactured by Great Lake, BC-58
  3Sb: diantimony trioxide
  4Sb: diantimony tetraoxide
  5Sb: diantimony pentaoxide Melt kneading
  Twin screw extruder manufactured by Japan Steel Works (Model TEX30HSST), 300° C., capacity: 10 kg/hr Injection molding Injection molding machine manufactured by Sanjyo Precision Machine, Model SAV-60-52.

The injection molding was conducted at a molding temperature of 260° C.

Measurement of Properties (1) Flame retardancy

A test was conducted by preparing 1/16 inch test pieces by injection molding, and the flame retardancy was evaluated by the evaluation process specified in UL-94. The flame retardancy increases in the order of NG, V-2, V-1, and V-0.

(2) Wear property (specific wear rate, coefficient of dynamic friction)

Ring-shaped test pieces prepared by injection molding and steel test pieces (S-45C) of the same shape were used for abrasion/wear test (ring-on-ring method). The test was conducted under the conditions including a linear velocity of 30 m/min, a load of 2.6 kg/cm$^2$, and a test period of 72 hours. The torque during the test was detected by using a load cell to calculate the coefficient of dynamic friction. Specific wear rate was also calculated for use as an index of slidability from the difference in the weight of the test piece before and after the sliding.

(3) Izod impact strength

Izod impact strength was measured by using a notched test piece in accordance with ASTM D256.

(4) MFR (melt flow rate)

Melt flow rate was measured at a temperature of 280° C. and under the load of 2.16 kg in accordance with ASTM D1238.

Example 1

10,000 g of polyethylene modified with maleic anhydride (MAPE) as the component (C) and 300 g of 11-aminoundecanoic acid (AU) as the component (D) were mixed in a Henschel mixer, and the mixture was fed to a twin screw extruder where the mixture was melt kneaded at 260° C. The thus kneaded mixture was dried under vacuum at 80° C. for 12 hours. Next, 5150 g of the kneaded mixture, 4500 g of polycarbonate (PC) resin as the component (A), and 230 g of brominated polycarbonate oligomer (BPC) and 120 g of diantimony pentaoxide (5Sb) as the component (F) were mixed in a Henschel mixer, and kneaded in a twin screw extruder at 300° C. to produce the resin composition. The resulting resin composition was dried at 120° C. for 8 hours, injection molded, and evaluated for the flame retardancy, the wear rate, the coefficient of dynamic friction, and the Izod impact strength. MFR was also measured. The results are shown in Table 2.

Examples 2 to 10 and Comparative Examples 1 to 5

The resin compositions were produced by repeating the procedure of Example 1 except that the component (C) and the component (D) were used in each Example at the proportion shown in Table 1 and the component (A) and the component (F) were used in each Example at the proportion shown in Table 1. The resulting resin compositions were dried at 120° C. for 8 hours, injection molded, and evaluated for the flame retardancy, the wear rate, the coefficient of dynamic friction, and the Izod impact strength. MFR was also measured. The results are shown in Table 2.

Examples 11 to 18 and Comparative Examples 6 to 11

The procedure of Example 1 was repeated by using the component (C) and the component (D) at the proportion shown in Table 1 to prepare kneaded mixture. The resulting kneaded mixture and the component (A), the component (B), the component (E) and the component (F) were used and the procedure of Example 1 was repeated to produce the resin composition. The thus produced resin compositions were dried at 120° C. for 8 hours, injection molded, and evaluated for the flame retardancy, the wear rate, the coefficient of dynamic friction, and the Izod impact strength. MFR was also measured. The results are shown in Table 2.

TABLE 1

| | Component | | | | | |
|---|---|---|---|---|---|---|
| | Component (A) Type, Amount (wt %) | Component (B) Type, Amount (wt %) | Component (C) Type, Amount (wt %) | Component (D) Type, Amount (wt %) | Component (E) Type, Amount (wt %) | Component (F) Type, Amount (wt %) |
| Examples | | | | | | |
| 1 | PC, 45 | — | MAPE, 50 | AU, 1.5 | — | BPC, 2.3 5Sb, 1.2 |
| 2 | PC, 75 | — | MAPE, 20 | AU, 1.5 | — | BPC, 2.3 5Sb, 1.2 |
| 3 | PC, 93 | — | MAPE, 50 | AU, 0.1 | — | BPC, 1.3 5Sb, 0.6 |
| 4 | PC, 93 | — | E$_p$ PP 5 | AU, 0.1 | — | BPC, 1.3 5Sb, 0.6 |
| 5 | PC, 93 | — | MAPE, 5 | AU, 0.1 | — | BPC, 1.3 5Sb, 0.6 |
| 6 | PC, 93 | — | MAPE, 5 | AC, 0.1 | — | BPC, 1.3 5Sb, 0.6 |
| 7 | PC, 93 | — | MAPE, 5 | AA, 0.1 | — | BPC, 1.3 5Sb, 0.6 |
| 8 | PC, 91.1 | — | MAPE, 5 | AU, 0.1 | — | BPC, 2.6 5Sb, 1.2 |
| 9 | PC, 93.9 | — | MAPE, 5 | AU, 0.1 | — | BPC, 0.7 5Sb, 0.3 |
| 10 | PC, 93 | — | MAPE, 5 | AU, 0.1 | — | BPC, 1.3 4Sb, 0.6 |
| 11 | PC, 75 | PP, 5 | MAPE, 15 | AU, 1.5 | — | BPC, 2.3 5Sb, 1.2 |
| 12 | PC, 75 | PP, 10 | MAPE, 10 | AU, 1.5 | — | BPC. 2.3 5Sb, 1.2 |

TABLE 1-continued

| | Component (A) Type, Amount (wt %) | Component (B) Type, Amount (wt %) | Component (C) Type, Amount (wt %) | Component (D) Type, Amount (wt %) | Component (E) Type, Amount (wt %) | Component (F) Type, Amount (wt %) |
|---|---|---|---|---|---|---|
| 13 | PC, 75 | PP, 15 | MAPE, 5 | AU, 1.5 | — | BPC, 2.3 5Sb, 1.2 |
| 14 | PC, 75 | PE, 10 | MAPE, 10 | AU, 1.5 | — | BPC, 2.3 5Sb, 1.2 |
| 15 | PC, 75 | PP, 1 | MAPE, 10 | AU, 1.5 | SEP, 9 | BPC, 2.3 5Sb, 1.2 |
| 16 | PC, 75 | PP, 5 | MAPE, 10 | AU, 1.5 | SEP, 5 | BPC, 1.3 5Sb, 0.6 |
| 17 | PC, 75 | PP, 9 | MAPE, 10 | AU, 1.5 | SEP, 10 | BPC, 1.3 5Sb, 0.6 |
| 18 | PC, 75 | PP, 5 | MAPE, 10 | AU, 1.5 | SEP, 5 | BPC, 2.3 |
| Comparative Examples | | | | | | |
| 1 | PC, 94.9 | — | MAPE, 5 | AC, 0.1 | — | — |
| 2 | PC, 93.6 | — | MAPE, 5 | AA, 0.1 | — | BPC, 1.3 |
| 3 | PC, 94.3 | — | MAPE, 5 | AU, 0.1 | — | 4Sb, 0.6 |
| 4 | PC, 94.3 | — | MAPE, 5 | AU, 0.1 | — | 5Sb, 0.6 |
| 5 | PC, 94.3 | — | MAPE, 5 | AU, 0.1 | — | 3Sb, 0.6 |
| 6 | PC, 83.6 | PP, 10 | MAPE, 5 | AU, 0.1 | — | BPC, 1.3 |
| 7 | PC, 84.3 | PP, 10 | MAPE, 5 | AU, 0.1 | — | 4Sb, 0.6 |
| 8 | PC, 84.3 | PP, 10 | MAPE, 5 | AU, 0.1 | — | 5Sb, 0.6 |
| 9 | PC, 84.3 | PP, 5 | MAPE, 5 | AU, 0.1 | SEP, 5 | BPC, 1.3 |
| 10 | PC, 84.3 | PP, 5 | MAPE, 5 | AU, 0.1 | SEP, 5 | 4Sb, 0.6 |
| 11 | PC, 84.3 | PP, 5 | MAPE, 5 | AU, 0.1 | SEP, 5 | 5Sb, 0.6 |

TABLE 2

| | Flame retardancy | Specific wear rate ($\times 10^{-15}$ m$^3$/Nm) | Coefficient of dynamic friction | Izod impact strength (kgfcm/cm) | MFR (g/10 min) |
|---|---|---|---|---|---|
| Examples | | | | | |
| 1 | V1 | 3.7 | 0.10 | 91 | 4.6 |
| 2 | V1 | 1.3 | 0.13 | 84 | 5.8 |
| 3 | V1 | 0.8 | 0.15 | 79 | 5.2 |
| 4 | V1 | 27 | 0.14 | 86 | 5.6 |
| 5 | V1 | 2.4 | 0.12 | 34 | 5.7 |
| 6 | V1 | 1.4 | 0.15 | 5.3 | |
| 7 | V1 | 1.4 | 0.12 | 80 | 5.2 |
| 8 | V1 | 5.3 | 0.12 | 78 | 5.6 |
| 9 | V1 | 2.6 | 0.14 | 84 | 5.8 |
| 10 | V1 | 1.0 | 0.13 | 83 | 5.2 |
| 11 | V1 | 1.9 | 0.13 | 88 | 5.6 |
| 12 | V1 | 1.6 | 0.09 | 90 | 5.7 |
| 13 | V1 | 1.4 | 0.16 | 92 | 5.2 |
| 14 | V1 | 2.9 | 0.18 | 85 | 5.6 |
| 15 | V1 | 0.15 | 0.14 | 89 | 5.5 |
| 16 | V1 | 0.18 | 0.15 | 80 | 5.7 |
| 17 | V1 | 0.11 | 0.13 | 79 | 5.1 |
| 18 | V1 | 0.12 | 0.15 | 85 | 5.0 |
| Comparative Examples | | | | | |
| 1 | NC | 0.14 | 0.12 | 90 | 5.9 |
| 2 | NC | 0.10 | 0.11 | 91 | 5.1 |
| 3 | NC | 0.11 | 0.16 | 89 | 23.8 |
| 4 | NC | 0.14 | 0.18 | 85 | 5.2 |
| 5 | NG | 0.16 | 0.12 | 81 | 16.0 |
| 6 | NG | 0.18 | 0.11 | 80 | 5.5 |
| 7 | NG | 0.12 | 0.11 | 83 | 18.3 |
| 8 | NG | 0.11 | 0.13 | 88 | 5.4 |
| 9 | NG | 0.13 | 0.14 | 81 | 5.6 |
| 10 | NG | 0.14 | 0.15 | 79 | 5.1 |
| 11 | NG | 0.14 | 0.10 | 78 | 4.9 |

INDUSTRIAL UTILITY

The polycarbonate/polyolefin resin composition of the present invention is provided with the excellent mechanical properties of the PC and the good moldability of the polyolefin. The resin compositions of the present invention also has excellent surface properties without undergoing delamination and a high flame retardancy. Therefore, the polycarbonate/polyolefin resin composition of the present invention is useful as a material for use in the production of interior and exterior parts, housings, mechanical parts (such as gear, cam, and the like) of automobiles and electric and electronic appliance.

The process of the present invention is capable of producing such PC/polyolefin resin composition in a convenient manner by using a kneader.

The molded article of the present invention is produced from the PC/polyolefin resin composition having the improved properties as described above, and therefore, such article is highly valuable when used as a material in the production of interior and exterior parts, housings, mechanical parts (such as gear, cam, and the like) of automobiles and electric and electronic appliance.

What is claimed is:

1. A polycarbonate resin composition produced by melt kneading
   (A) a polycarbonate resin having a melt flow rate of from 1.0 g/10 minutes to 30.0 g/10 minutes and a number average molecular weight of from about 1,000 to 100,000,
   (C) a modified polyolefin resin modified with at least one functional group selected from the group consisting of an epoxy group, a carboxyl group, and an acid anhydride group,
   (D) a compound represented by the following formula (d):

$$HOOC\text{---}R\text{---}NH_2 \qquad (d)$$

wherein R is an alkylene group, an alkylidene group, an oligomethylene group, a phenylene group, or a naphthylene group containing at least 5 carbon atoms, the phenylene group and the naphthylene group being optionally substituted with a substituent, and
   (F) a brominated polycarbonate oligomer and at least one selected from diantimony tetraoxide, diantimony pentaoxide and combinations thereof, wherein said compound (D) is present in an amount from 0.05% by weight to 5.0% by weight.

2. A polycarbonate resin composition according to claim 1 produced by melt kneading
   said polycarbonate resin (A), said modified polyolefin resin (C), said compound (D) represented by the formula (d), said brominated polycarbonate oligomer and said at least one selected from diantimony tetraoxide, diantimony pentaoxide and combinations thereof (F), and
   (B) a polyolefin resin having a melt flow rate of from 0.1 g/10 minutes to 70.0 g/10 minutes wherein said polyolefin resin is present in an amount of from about 0.1% by weight to 60.0% by weight.

3. A polycarbonate resin composition wherein the components of the resin composition of claim 2 are blended at the proportion of
   (A) 40 to 99% by weight,
   (C) 0.5 to 60% by weight,
   (F) 0.3 to 15% by weight.

4. A molded article produced by melt molding the polycarbonate resin composition of claim 2, wherein the polyolefin resin (C) of the composition comprises particles which are dispersed in a region of the article of from a surface of the molded article to a depth of 20 μm and wherein an average aspect ratio (major axis/minor axis) of the dispersed polyolefin resin particles is up to 5.

5. A molded article according to claim 4 wherein said particles of the polyolefin resin are polyethylene particles.

6. A polycarbonate resin composition according to claim 1 produced by melt kneading
   said polycarbonate resin (A), said modified polyolefin resin (C), said compound (D) represented by the formula (d), said brominated polycarbonate oligomer and said at least one selected from diantimony tetraoxide, diantimony pentaoxide and combinations thereof (F),
   (B) a polyolefin resin having a melt flow rate of from 0.1 g/10 minutes to 70.0 g/10 minutes, and
   (E) a styrene copolymer resin,
   wherein said polyolefin resin is present in an amount of from about 0.1% by weight to 60.0% by weight and said styrene copolymer resin is present in an amount of from about 0.5% by weight to 30.0% by weight.

7. A polycarbonate resin composition wherein the components of the resin composition of claim 6 are blended at the proportion of
   (A) 40 to 99% by weight,
   (C) 0.5 to 60% by weight,
   (F) 0.3 to 15% by weight.

8. A polycarbonate resin composition having an improved compatibility wherein the components of the resin composition of claim 1 are blended at the proportion of
   (A) 40 to 99% by weight,
   (C) 0.5 to 60% by weight
   (F) 0.3 to 15% by weight.

9. A polycarbonate resin composition according to claim 1 wherein said modified polyolefin resin (C) is at least one member selected from the group consisting of straight-chain low density polyethylene modified with maleic anhydride, low density polyethylene modified with maleic anhydride, and high density polyethylene modified with maleic anhydride.

10. A molded article produced by melt molding the polycarbonate resin composition of claim 1.

11. A process for producing a polycarbonate resin composition comprising the steps of
    melt kneading (C) a modified polyolefin resin modified with at least one functional group selected from the group consisting of an epoxy group, a carboxyl group, and an acid anhydride group, and from 0.5% by weight to 5.0% by weight of (D) a compound represented by the following formula (d):

$$HOOC\text{---}R\text{---}NH_2 \qquad (d)$$

wherein R is an alkylene group, an alkylidene group, an oligomethylene group, a phenylene group, or a naphthylene group containing at least 5 carbon atoms, the phenylene group and the naphthylene group being optionally substituted with a substituent; and
    adding (A) a polycarbonate resin having a melt flow rate of from 1.0 g/10 minutes to 30.0 g/10 minutes and a number average molecular weight of from about 1,000 to about 100,000 and (F) a brominated polycarbonate oligomer and at least one selected from diantimony tetraoxide, diantimony pentaoxide and combinations thereof, to the melt kneaded (C) and (D) and further melt kneading the mixture.

12. A process for producing a polycarbonate resin composition according to claim 11 comprising the steps of melt kneading (C) said modified polyolefin and (D) said compound represented by the formula (d); and adding (A) said polycarbonate resin, (B) a polyolefin resin having a melt flow rate of from 0.1 g/10 minutes to 70.0 g/10 minutes, and (F) said brominated polycarbonate oligomer and said at least one selected from diantimony tetraoxide, diantimony pentaoxide and combinations thereof, to the melt kneaded (C) and (D), wherein said polyolefin resin (B) is present in an amount of from 0.1% by weight to 60.0% by weight, and further melt kneading the mixture.

13. A process for producing a polycarbonate resin composition according to claim 11 comprising the steps of melt kneading (C) said modified polyolefin resin and (D) said compound represented by the formula (d); and adding (A) said polycarbonate resin, (B) a polyolefin resin having a melt flow rate of from 0.1 g/10 minutes to 70 g/10 minutes, (F) said brominated polycarbonate oligomer and said at least one selected from diantimony tetraoxide, diantimony pentaoxide and combinations thereof, and (E) a styrene copolymer resin to the melt kneaded (C) and (D), wherein said polyolefin resin is present in an amount of from 0.1% by weight to 60.0% by weight and said styrene copolymer resin is present in an amount of from 0.5% by weight to 30.0% by weight, and further melt kneading the mixture.

* * * * *